US012784147B2

(12) United States Patent
Kobayashi et al.

(10) Patent No.: US 12,784,147 B2
(45) Date of Patent: Nov. 3, 2026

(54) OBSERVATION SYSTEM AND ARTIFACT CORRECTION METHOD FOR SAME

(71) Applicant: HITACHI HIGH-TECH CORPORATION, Tokyo (JP)

(72) Inventors: Mitsutoshi Kobayashi, Tokyo (JP); Atsushi Miyamoto, Tokyo (JP); Yoshinobu Hoshino, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 217 days.

(21) Appl. No.: 18/702,160

(22) PCT Filed: Oct. 29, 2021

(86) PCT No.: PCT/JP2021/040161
§ 371 (c)(1),
(2) Date: Apr. 17, 2024

(87) PCT Pub. No.: WO2023/073969
PCT Pub. Date: May 4, 2023

(65) Prior Publication Data
US 2024/0412333 A1 Dec. 12, 2024

(51) Int. Cl.
*G06T 5/60* (2024.01)
*G06T 7/00* (2017.01)

(52) U.S. Cl.
CPC .............. *G06T 5/60* (2024.01); *G06T 7/0002* (2013.01); *G06T 2207/10061* (2013.01); *G06T 2207/20081* (2013.01); *G06T 2207/30148* (2013.01)

(58) Field of Classification Search
CPC ........... G06T 5/60; G06T 7/0002; G06T 7/00; G06T 2207/10061; G06T 2207/20081;
(Continued)

(56) References Cited

U.S. PATENT DOCUMENTS 10,852,379 B2 * 12/2020 Chen .................. G01R 33/5608
2017/0372193 A1 * 12/2017 Mailhe ................... G06N 3/045
(Continued)

FOREIGN PATENT DOCUMENTS

EP 3477583 A1 * 5/2019 ............. G06N 3/045
JP 2020-099667 A 7/2020

OTHER PUBLICATIONS

Anderson, H.S. et al., "Sparse imaging for fast electron microscopy", Proceedings of SPIE-IS&T Electronic Imaging, Feb. 14, 2013, vol. 8657, 86570C, Computational Imaging XI, pp. 1-12.
(Continued)

*Primary Examiner* — Carol W Chan
(74) *Attorney, Agent, or Firm* — Foley & Lardner LLP

(57) ABSTRACT

Provided is technology capable of uniformly reducing artifacts that are in a reconstructed image and that change due to a sampling coordinate group. This observation system comprises an image capture device and a processor subsystem. The processor subsystem sets a sparse sampling coordinate group for a sample, acquires a pixel value group corresponding to the sampling coordinate group on the sample, and gives, to a correction engine, the pixel value group or a first reconstructed image that has been generated on the basis of the pixel value group, so that a second reconstructed image is generated.
The correction engine is trained using the following data (1) to (3) pertaining to the sample or a training sample:
(1) the sampling coordinate group;
(2) the pixel value group or a reconstructed image which has artifacts and which has been reconstructed from the pixel value group using the sampling coordinate group; and
(3) an image which contains no artifacts or in which artifacts are reduced.

16 Claims, 14 Drawing Sheets

(58) Field of Classification Search
CPC . G06T 2207/30148; G06T 2207/10056; G06T 2207/20084; H01J 37/22
See application file for complete search history.

(56) References Cited

U.S. PATENT DOCUMENTS

| | | | | |
|---|---|---|---|---|
| 2018/0374245 | A1* | 12/2018 | Xu | G06T 5/77 |
| 2019/0005686 | A1* | 1/2019 | Liu | G06N 3/08 |
| 2019/0128989 | A1* | 5/2019 | Braun | G01R 33/56509 |
| 2019/0147588 | A1* | 5/2019 | Rowley Grant | G06T 7/0012 382/131 |
| 2020/0196973 | A1 | 6/2020 | Zhou et al. | |
| 2020/0219252 | A1* | 7/2020 | Tsuyuki | A61B 6/5217 |

OTHER PUBLICATIONS

Boyuan, Ma et al., "Deep learning-based automatic inpainting for material microscopic images", Journal of Microscopy, Sep. 9, 2020, vol. 281, issue 3, pp. 177-189.
International Search Report with English Translation and Written Opinion of International Patent Application No. PCT/JP2021/040161 dated Jan. 18, 2022 (10 pages).
Potocek. P. et al., "Sparse Scanning Electron Microscopy Data Acquisition and Deep Neural Networks for Automated Segmentation in Connectomics", Microscopy and Microanalysis, Jan. 25, 2021, vol. 26. pp. 403-412, https://www.researchgate.net/publication/340490465.

* cited by examiner

[Fig. 1]
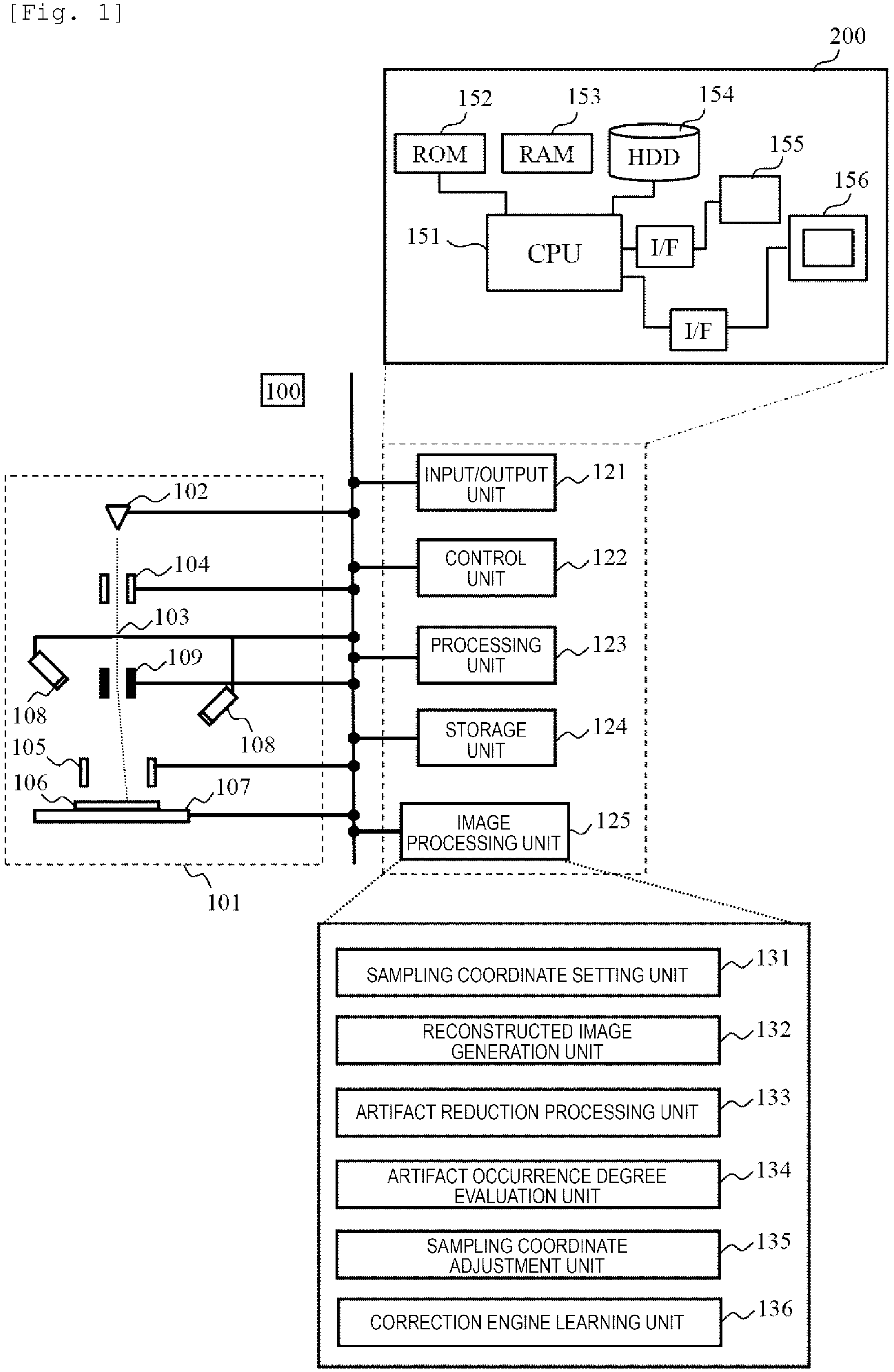

[Fig. 2]
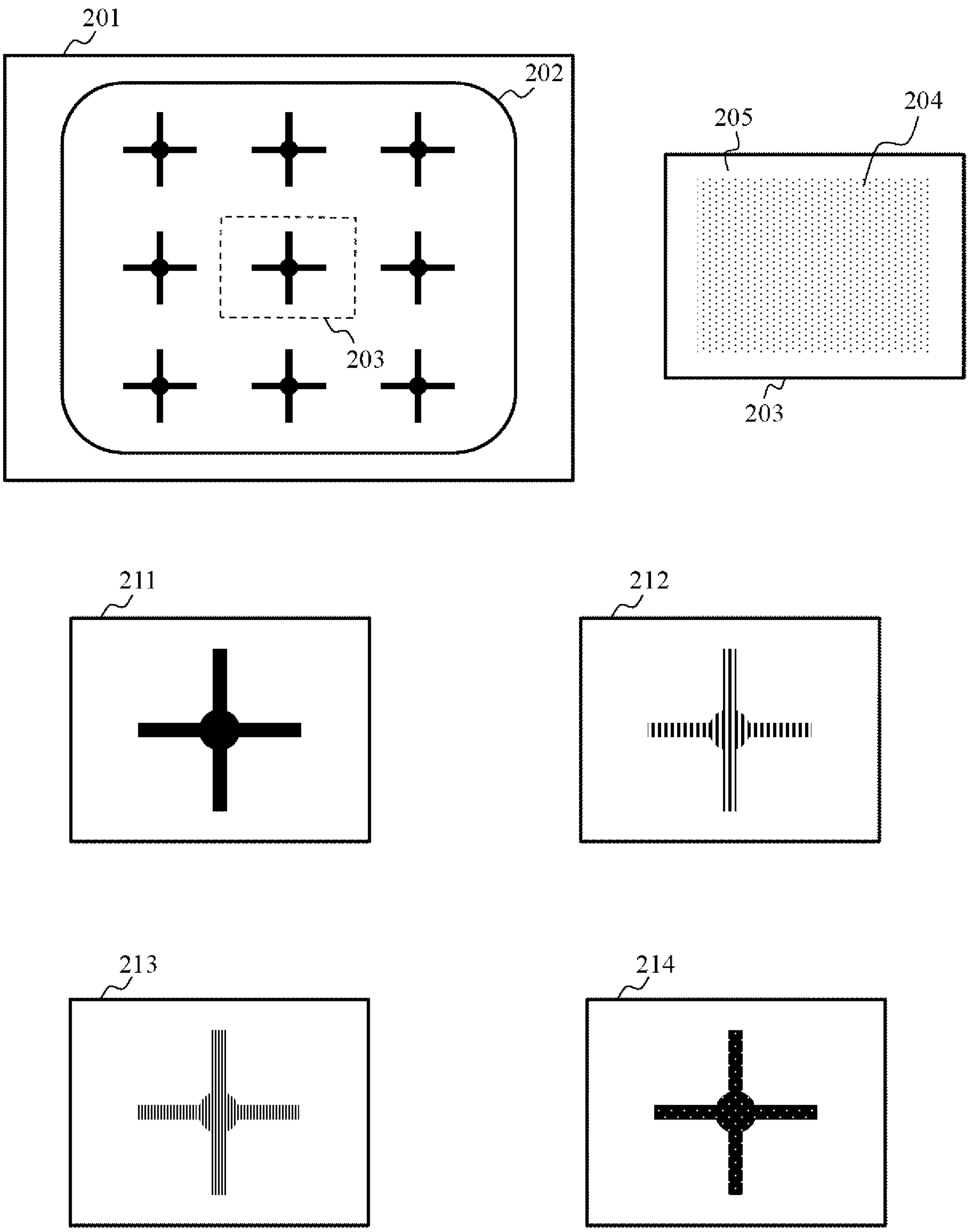

[Fig. 3]
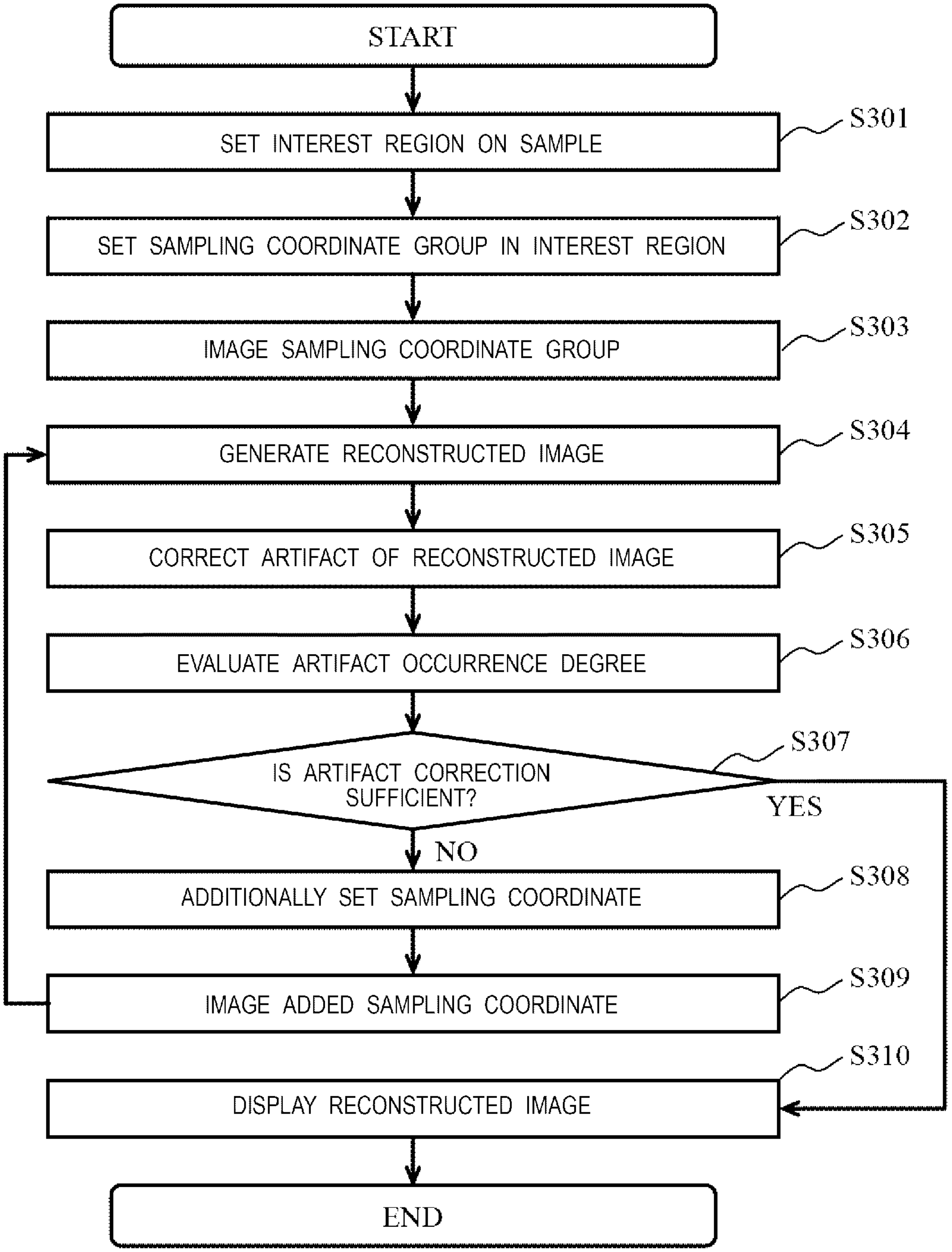

[Fig. 4]
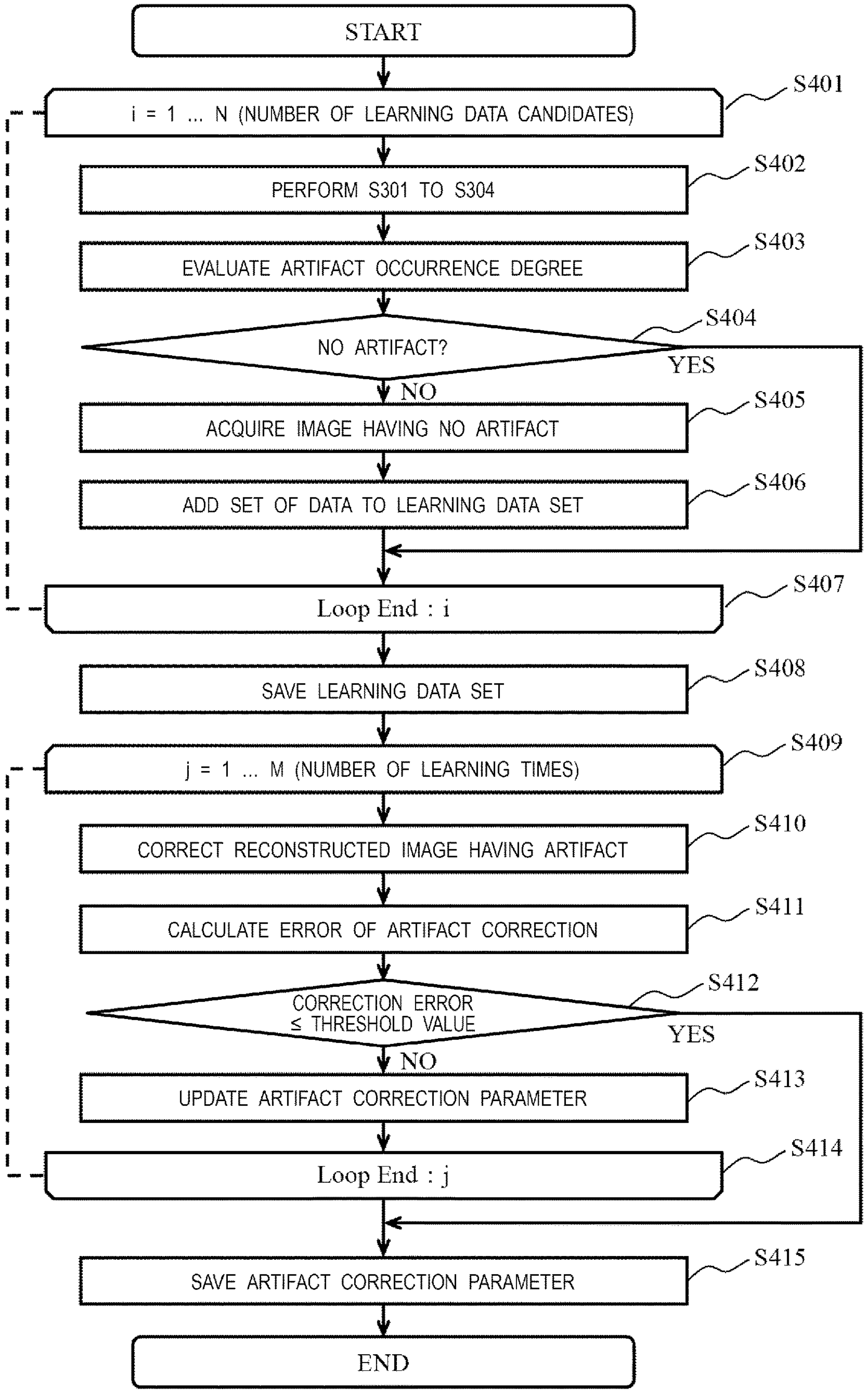

[Fig. 5]
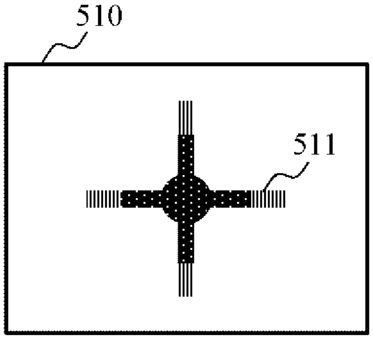
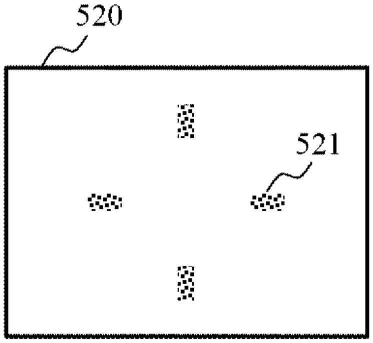
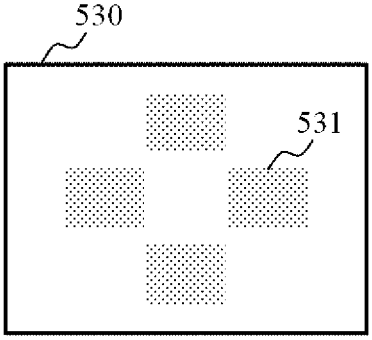

[Fig. 6]
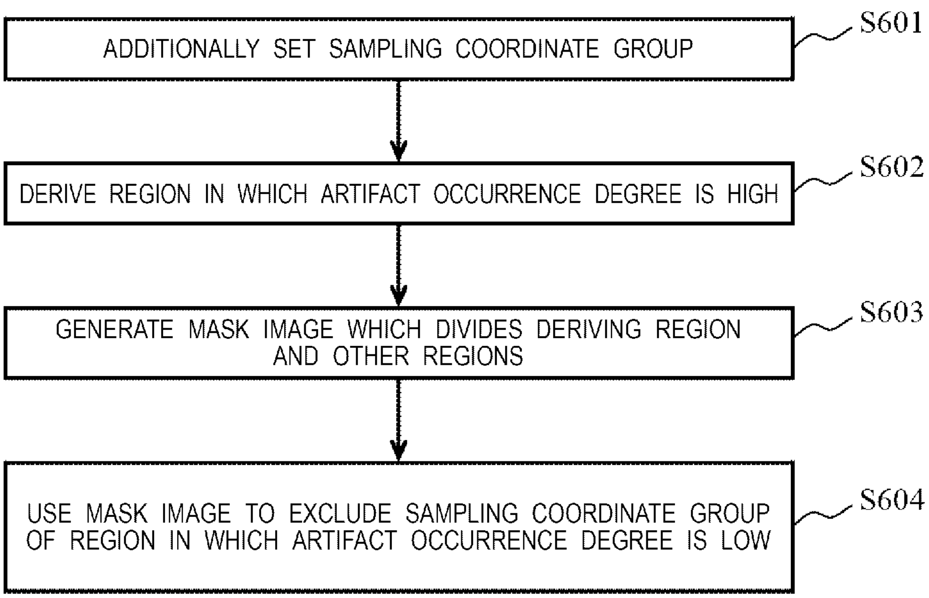

[Fig. 7]
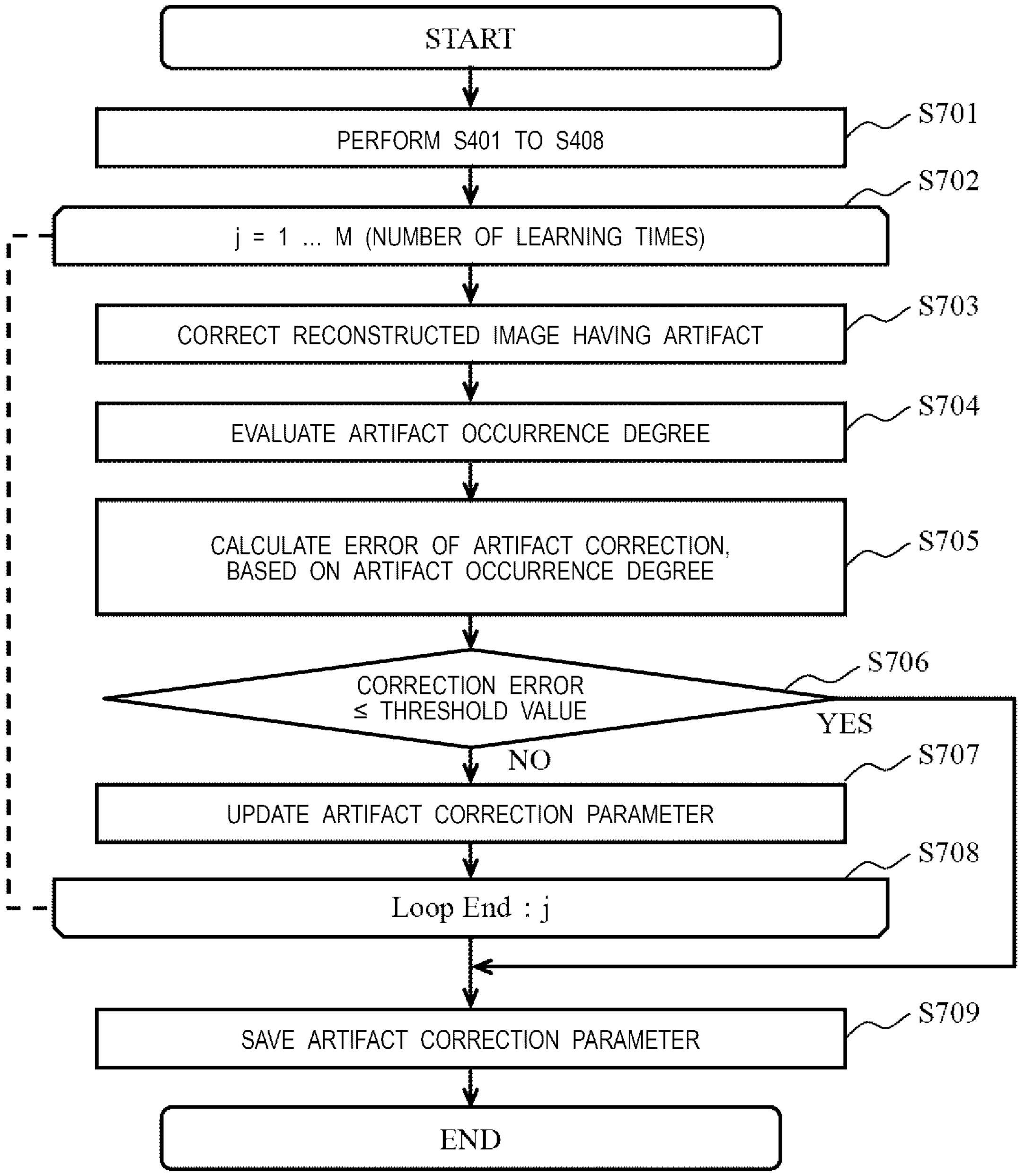

[Fig. 8]
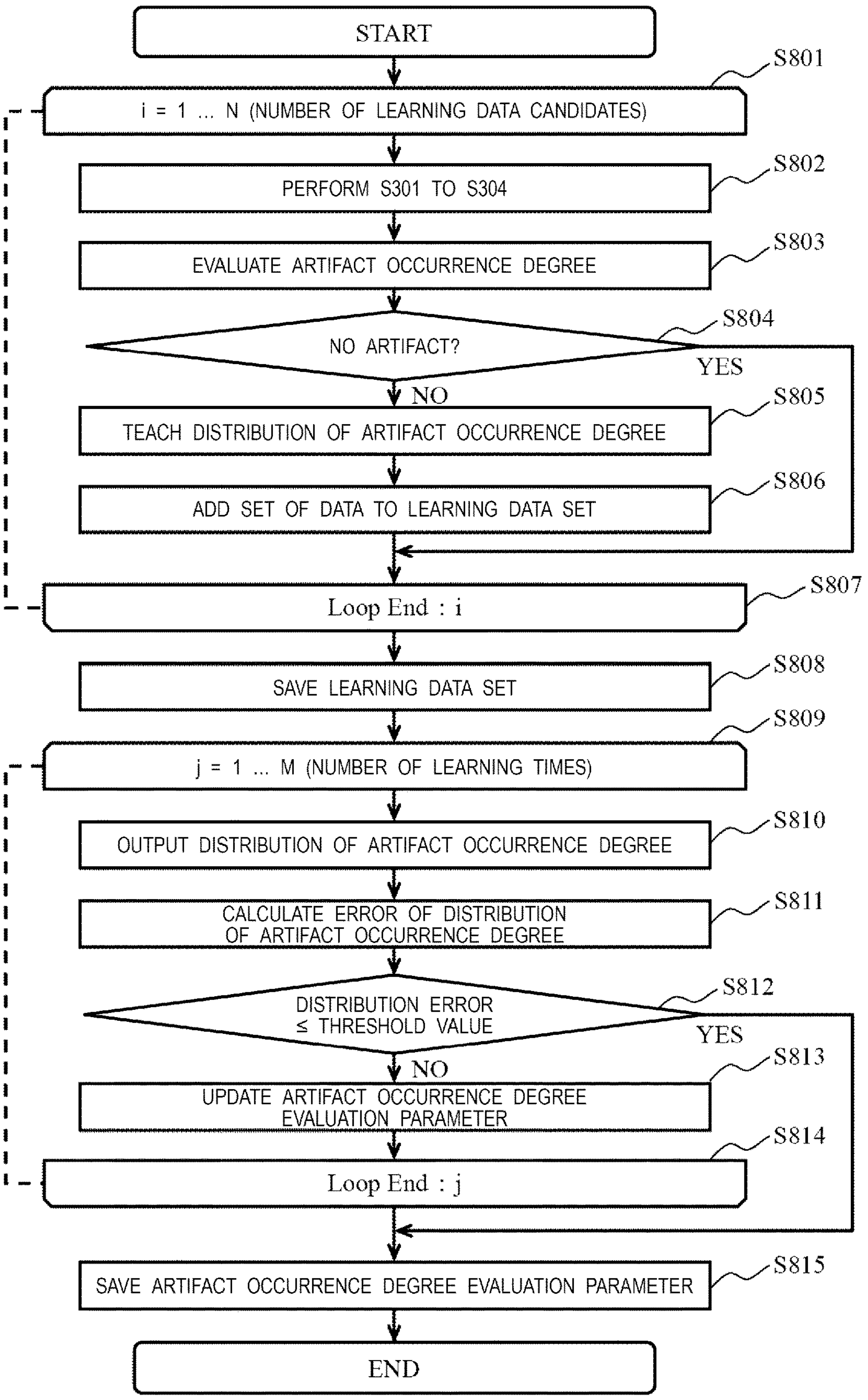

[Fig. 9]
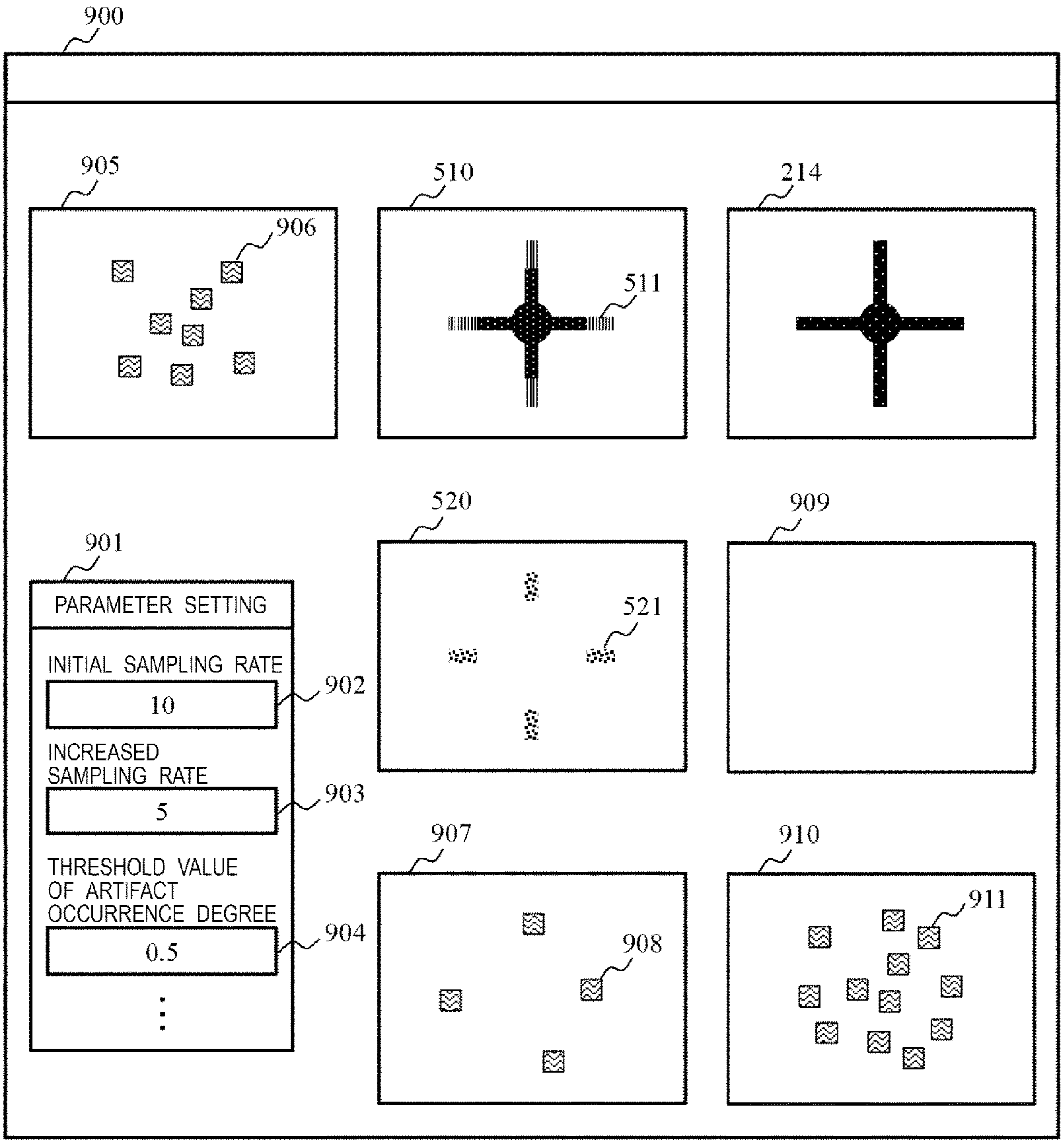

[Fig. 10]
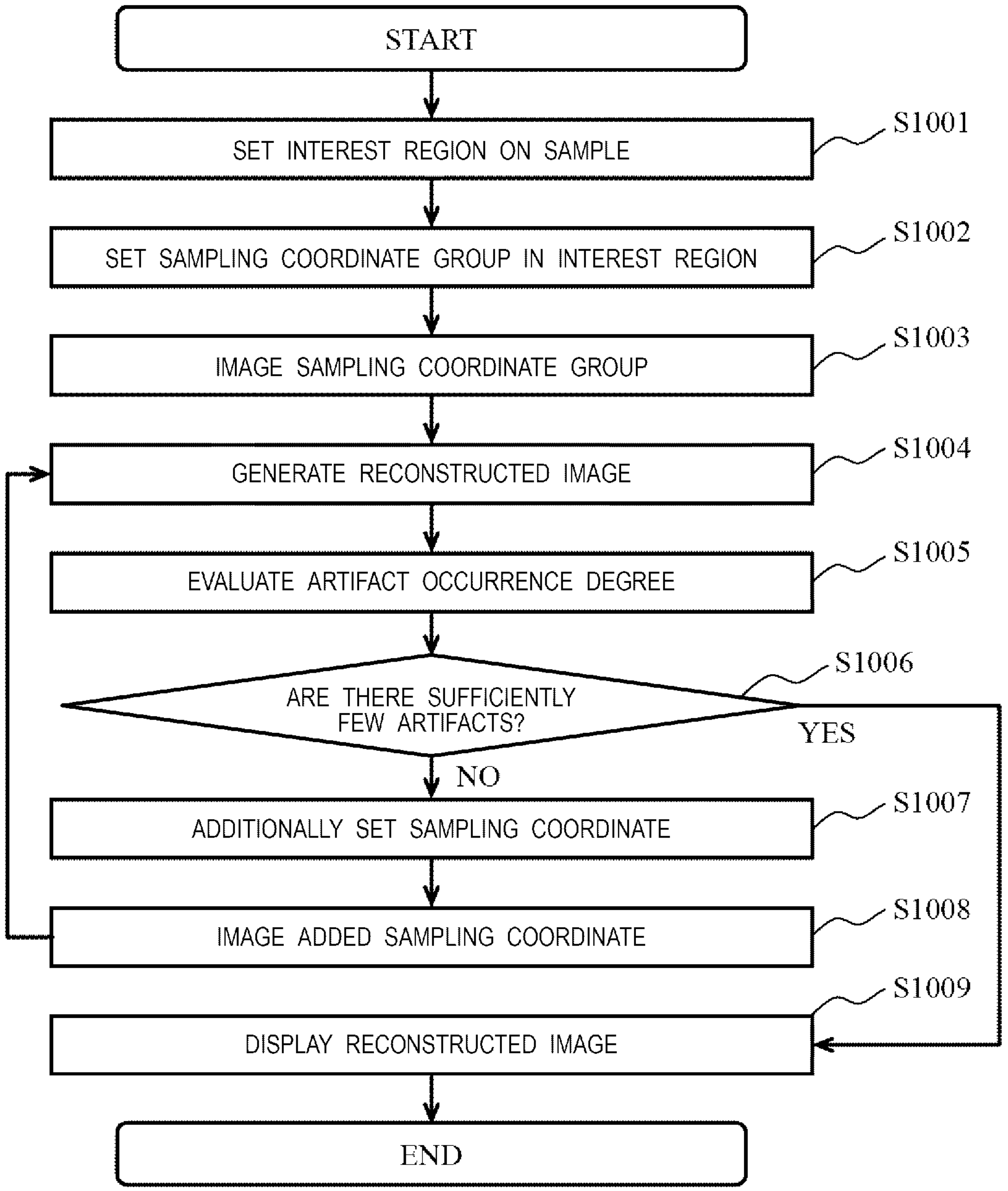

[Fig. 11]
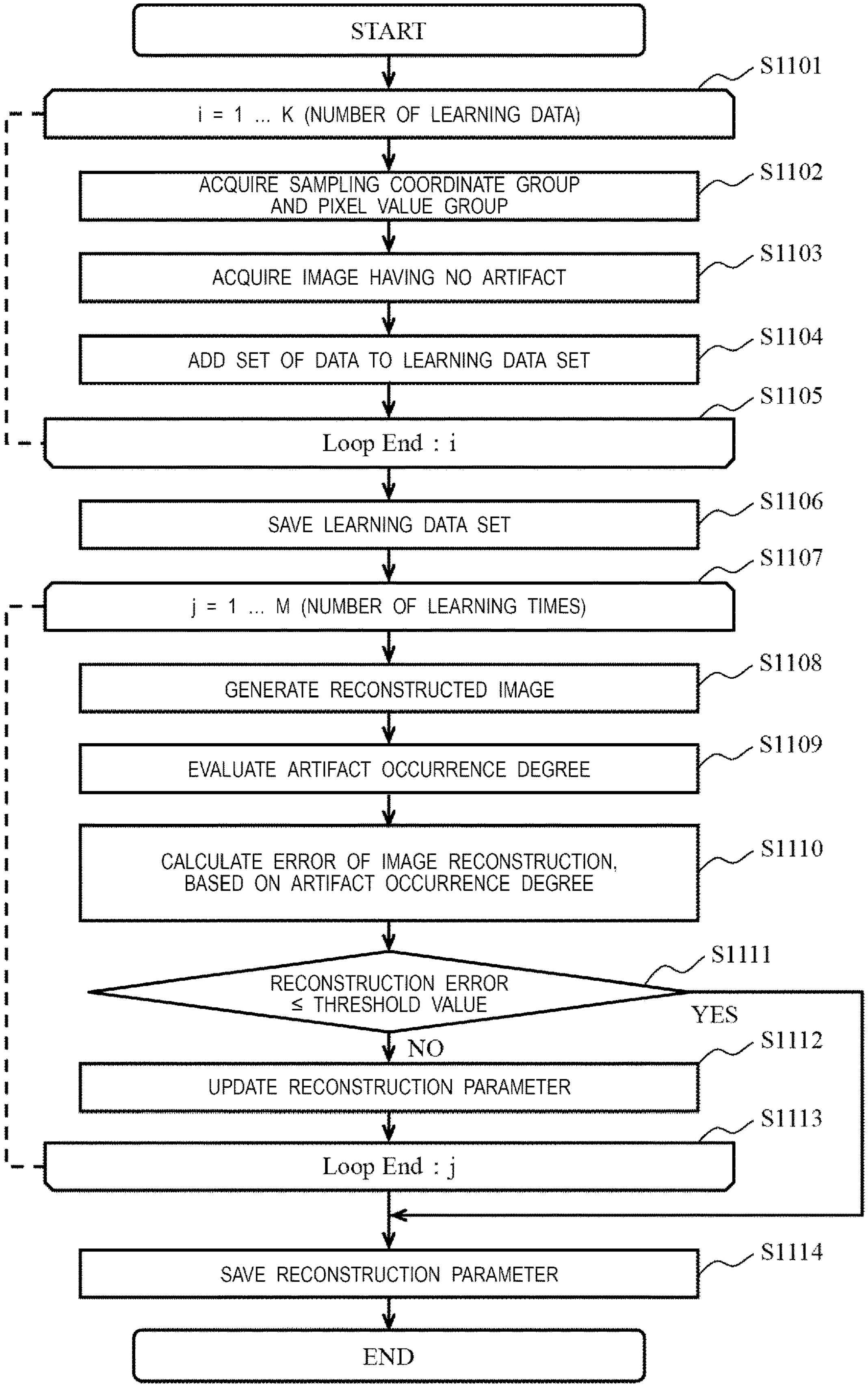

[Fig. 12]
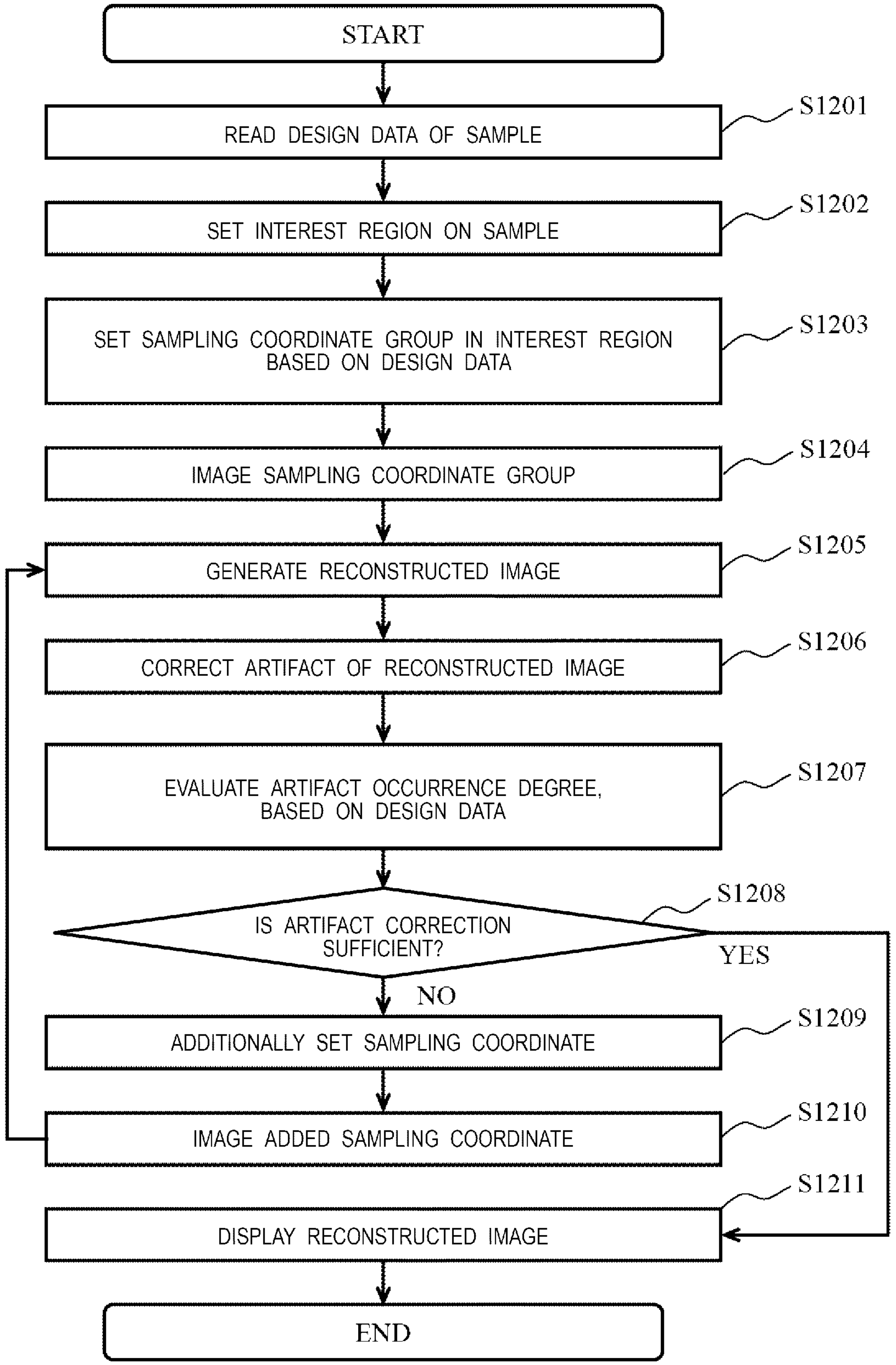

[Fig. 13]
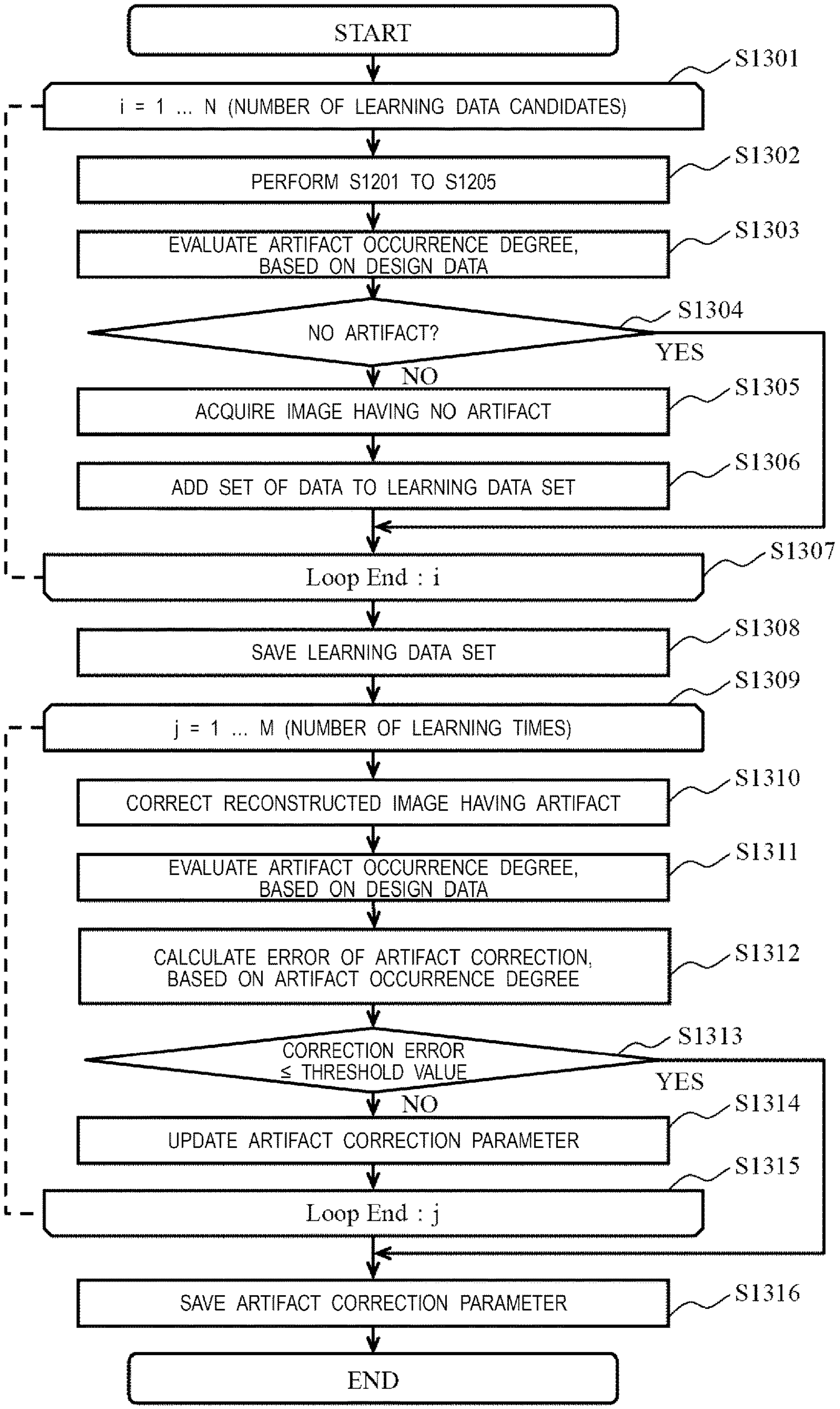

[Fig. 14]
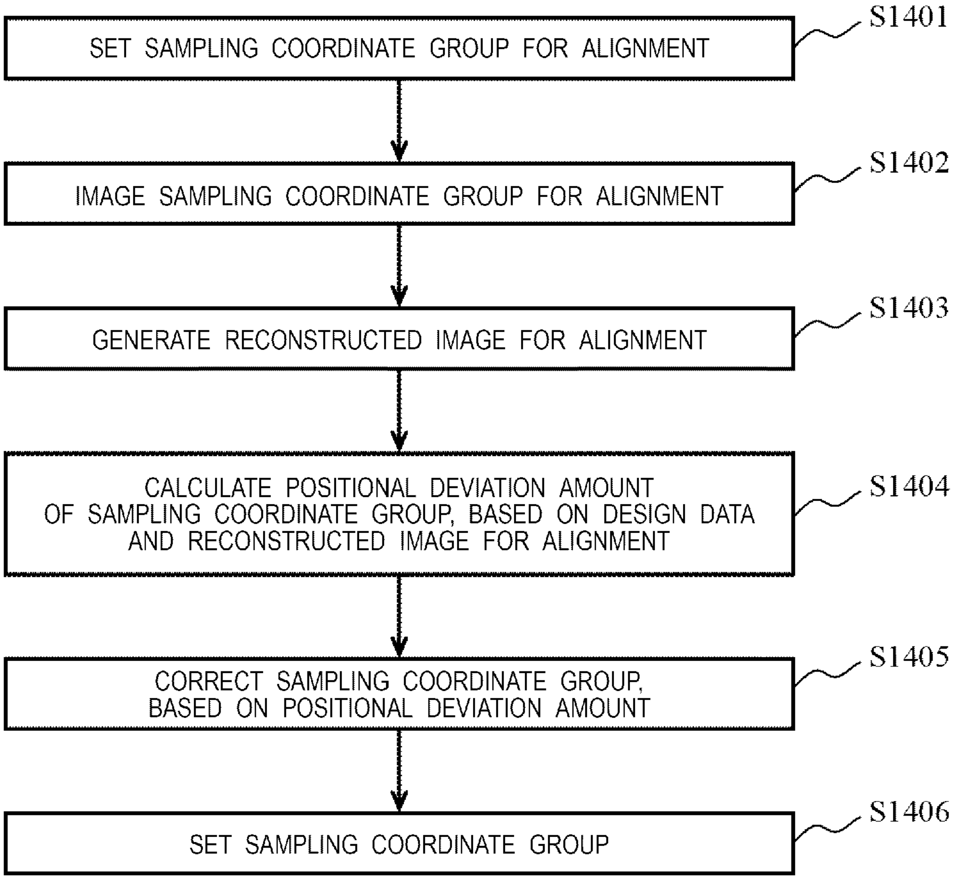

OBSERVATION SYSTEM AND ARTIFACT CORRECTION METHOD FOR SAME

TECHNICAL FIELD

The present invention relates to an observation system and an artifact correction method for the observation system.

BACKGROUND ART

In image reconstruction from sparse sampling data in an observation device such as a charged particle microscope device, a magnetic resonance imaging (MRI) device, and a computer tomographic device imaging (CT: computed tomography), artifacts as a secondary image pattern which does not exist in an original imaging target may occur in a reconstructed image (reconstructed image). A technique for reducing the artifacts has been proposed in PTL 1, for example.

According to a method disclosed in PTL 1, the artifacts of the reconstructed image are reduced by using a correction engine trained to learn artifact reduction of the reconstructed image. However, in a case of this method, the artifacts differ depending on an imaging method. Therefore, an effect of reducing the artifacts varies, thereby causing a problem in that it is difficult to uniformly reduce the artifacts.

CITATION LIST

Patent Literature

PTL 1: JP2020-99667A

SUMMARY OF INVENTION

Technical Problem

In order to solve this problem, the present invention aims to provide an observation system and an artifact correction method which can uniformly reduce artifacts varying due to a sampling coordinate group in a reconstructed image.

Solution to Problem

In order to solve the above-described problem, an observation system according to the present invention includes an imaging device and a processor subsystem. The processor subsystem sets a sparse sampling coordinate group with respect to a sample, acquires a pixel value group corresponding to the sampling coordinate group on the sample, and generates a second reconstructed image by assigning either the pixel value group or a first reconstructed image generated based on the pixel value group to a correction engine.

The correction engine is trained by using the following data (1) to (3) regarding the sample or a learning sample:

(1) the sampling coordinate group, (2) the pixel value group or a reconstructed image having an artifact reconstructed from the pixel value group by using the sampling coordinate group, and (3) an image which includes no artifact or in which the artifacts are reduced.

Advantageous Effects of Invention

According to the present invention, it is possible to provide an observation system and an artifact correction method which can uniformly reduce artifacts varying due to a sampling coordinate group in a reconstructed image.

BRIEF DESCRIPTION OF DRAWINGS

FIG. 1 is a schematic view illustrating an example of a schematic configuration of a scanning electron microscope device 100 according to a first embodiment.

FIG. 2 is a schematic view illustrating an overview of artifact correction in the scanning electron microscope device 100 of the first embodiment.

FIG. 3 is a flowchart illustrating an example of a procedure for performing artifact correction processing in the first embodiment.

FIG. 4 is a flowchart illustrating a specific example of a learning sequence of a correction engine used in Step S305 in FIG. 3.

FIG. 5 schematically illustrates examples of a reconstructed image 510 of an interest region 203, an image 520 obtained by mapping an artifact occurrence degree of the reconstructed image 510, and a sparse sampling coordinate group 530 additionally set in the interest region 203.

FIG. 6 is a flowchart illustrating details of a procedure for additionally setting a sampling coordinate group in a region where the artifact occurrence degree is high in Step S308.

FIG. 7 is a flowchart according to a first modification example of the first embodiment.

FIG. 8 is a flowchart according to a second modification example of the first embodiment.

FIG. 9 illustrates an example of a GUI screen in which an image obtained by mapping the artifact occurrence degree is displayed together with a reconstructed image on a screen of a display 156 in the device according to the first embodiment.

FIG. 10 is a flowchart illustrating an example of a procedure for performing artifact correction processing in a second embodiment.

FIG. 11 is a flowchart illustrating an example of a learning procedure of a correction engine in the second embodiment.

FIG. 12 is a flowchart illustrating an example of a procedure for performing artifact correction processing in a third embodiment.

FIG. 13 is a flowchart illustrating a specific example of a learning sequence of the correction engine used in Step S1206.

FIG. 14 is a flowchart illustrating an example of a specific procedure for aligning a sampling coordinate group, based on design data in Step S1203 of the third embodiment.

DESCRIPTION OF EMBODIMENTS

Hereinafter, embodiments will be described with reference to the drawings. In the accompanying drawings, functionally similar elements may be designated by the same number. The accompanying drawings represent embodiments and implementation examples in accordance with principles of the present disclosure. Meanwhile, the accompanying drawings are provided to understand the present disclosure, and should not be used to limit the present disclosure in any way. Descriptions in the present specification are merely typical examples, and are not intended to limit the scope of claims or application examples of the present disclosure in any way.

The present embodiment is described in sufficient detail for those skilled in the art to implement the present disclosure. Meanwhile, other implementations and other forms can be adopted, and it is necessary to understand that a configuration and a structure can be modified, and various elements can be replaced without departing from the scope and the concept of the technical idea of the present disclosure. Therefore, the following description should not be interpreted as being limited to this.

First Embodiment

With reference to FIG. 1, a scanning electron microscope device 100 which is an example of an observation system according to a first embodiment will be described. FIG. 1 is a schematic view illustrating an example of a schematic configuration of the scanning electron microscope device 100 according to the first embodiment. In this drawing, physical components and logical components are illustrated without distinction.

As an example, the scanning electron microscope device 100 includes a scanning electron microscope 101, an input/output unit 121, a control unit 122, a processing unit 123, a storage unit 124, and an image processing unit 125. The scanning electron microscope 101 is an imaging unit that images a sample 106 and acquires the image. The input/output unit 121, the control unit 122, the processing unit 123, the storage unit 124, and the image processing unit 125 are realized by a computer 200 (processor subsystem), for example. For example, the computer 200 may be a general-purpose computer, and may include a CPU 151 (processor), a ROM 152, a RAM 153, a hard disk drive 154, an input device 155, and a display 156 (display unit). The computer 200 may be connected to the scanning electron microscope 101 via a network. The CPU 151 is one type of processors, and may be a GPU, a semiconductor device capable of other arithmetic processing, or a combination thereof. The computer 200 may have a plurality of processors or memories, and a configuration of the computer 200 in FIG. 1 is understood as an example. The input/output unit 121, the control unit 122, the processing unit 123, the storage unit 124, and the image processing unit 125 may be realized by the common computer 200, or may be realized by the separate computer 200.

The scanning electron microscope 101 generates an electron beam 103 (charged particle beam) from an electron gun 102, and focuses the electron beam 103 on a surface of the sample 106 by causing the electron beam 103 to pass through a condenser lens 104 and an objective lens 105. A secondary electron or a backscattered electron generated from the sample 106 is detected by a detector 108, and an image generated in accordance with a detection signal is saved in the storage unit 124. The storage unit 124 may include the RAM 153 and hard disk drive 154 (memory) of the computer 200. That is, the storage unit 124 can also be a memory. The scanning electron microscope 101 and the storage unit 124 form an image acquisition unit that acquires an image of the sample.

With regard to the detector 108, one scanning electron microscope 100 may include a plurality of detectors of the same type. In addition, the detector 108 may be a combination of different types of detectors (for example, a combination of a detector that detects an electron and a detector that detects an electromagnetic wave, a combination of detectors that detects only particles whose energy or spin direction falls within a specific range, or a combination of a secondary electron detector and a backscattered electron detector), or a plurality of detectors of the same type may be provided at different disposition positions. When the plurality of detectors are provided, a plurality of images can be acquired by performing one normal imaging operation.

The sample 106 can be placed on a stage 107. An image can be acquired at any position on the sample 106 by moving the stage 107 in a horizontal direction. In addition, the sample 106 can be scanned with the electron beam 103 by causing a beam deflector 109 to two-dimensionally change an orientation of the electron beam 103.

The input/output unit 121 inputs an instruction relating to an image capturing position or an image capturing condition from the outside by using the input device 155, and visualizes the obtained image. For example, the input/output unit 121 has a function of outputting and displaying the visualized image to and on the display 156. In the scanning electron microscope device 100, the display 156 may be omitted, and the input device 155 may be omitted. The input device 155 may be a network interface.

The control unit 122 is configured to perform various types of controlling on the scanning electron microscope 101 (for example, controlling a voltage applied to the electron gun 102, controlling focal point positions of the condenser lens 104 and the objective lens 105, controlling a position of the stage 107, and controlling a deflection degree of the beam deflector 109). The scanning electron microscope 101 in the following embodiment can perform sparse sampling, and the control unit 122 realizes the sparse sampling by controlling the electron gun 102, the condenser lens 104, the objective lens 105, and the beam deflector 109. The control unit 122 can be realized by a computer program stored in the CPU 151 and the ROM 152 of the computer 200. The computer program can be recorded on a portable recording medium. The portable storage medium is a non-volatile storage medium.

In addition, the control unit 122 is configured to control the input/output unit 121, the processing unit 123, the storage unit 124, and the image processing unit 125. The processing unit 123 performs various types of processing, for example, such as processing for generating a random number for setting a random sampling coordinate, and arithmetic processing for automatic focusing required for focusing a focal point of the electron beam 103 on a surface of the sample 106. The storage unit 124 stores (saves) information relating to the interest region, a sparse sampling coordinate group, a reconstructed image, a trained model for artifact reduction processing, data relating to an artifact occurrence degree of the reconstructed image, a learning data set, and various processing parameters. The image processing unit 125 is in charge of image processing on the acquired data. A computer and an operator performing learning of the correction engine and a computer and an operator performing artifact correction of the present embodiment by using the trained correction engine may be the same or may be different.

The image processing unit 125 is realized by the computer 200 and image processing software stored in the computer 200. For example, the image processing unit 125 includes a sampling coordinate setting unit 131, a reconstructed d image generation unit 132, an artifact reduction processing unit 133, an artifact occurrence degree evaluation unit 134, a sampling coordinate adjustment unit 135, and a correction engine learning unit 136. Each of the units 131 to 136 is realized in such a manner that the CPU 151 (processor) of the computer 200 reads and executes the image processing software stored in a memory (ROM 152 or the like).

The sampling coordinate setting unit 131 sets a sparse sampling coordinate group in the interest region of the sample 106. In the present specification, expression of "setting the sampling coordinate group" is used to mean not only generating a new sampling coordinate group but also updating a preset sampling coordinate group. The sampling coordinate group includes coordinate data of a plurality of sampling points. The reconstructed image generation unit 132 generates a reconstructed image (first reconstructed image), based on a pixel value group acquired by irradiating the sparse sampling coordinate group of the interest region with the electron beam. As an example, a value of the secondary electron corresponding to a pixel of an image signal obtained from the scanning electron microscope 100 (imaging device) can be digitized as a pixel value, and a set of the pixel values can be set as the pixel value group. Alternatively, the value of the secondary electron can be converted once into a certain value, and thereafter, the value can be further converted into the pixel values to obtain the pixel value group.

The artifact reduction processing unit 133 performs artifact reduction processing on the first reconstructed image, and generates a reconstructed image (second reconstructed image) having fewer artifacts compared to the first reconstructed image. In addition, the artifact reduction processing unit 133 trains the correction engine by using a plurality of sets of learning data sets (teaching data) in which the sparse sampling coordinate group, the reconstructed image having the artifact, and fully sampled captured images (images having a few artifact or no artifact) are used as one set. In this manner, the correction engine which performs artifact reduction processing of the reconstructed image is generated. Instead of (or in addition to) the fully sampled captured images, learning of the correction engine can be performed by using the reconstructed image after the artifact reduction processing. For example, when the fully sampled captured images cannot be obtained, learning can be performed by using the reconstructed image after the artifact reduction processing instead of the fully sampled captured images. In addition, learning of the correction engine can also be performed by using an artificially prepared ideal image such as a simulation image instead of the fully sampled captured images.

The artifact occurrence degree evaluation unit 134 evaluates the artifact occurrence degree in the reconstructed image, based on predetermined evaluation criteria. The sampling coordinate adjustment unit 135 adds the sampling coordinate group to the sampling coordinate group set by the sampling coordinate setting unit 131, based on the artifact occurrence degree. The correction engine learning unit 136 learns the correction engine by using (i) the sampling coordinate group, (ii) the pixel value group corresponding to the sampling coordinate group or the reconstructed image having the artifact which is reconstructed from the pixel value group by using the sampling coordinate group, and (iii) the image which includes no artifact or in which the artifacts are reduced. The correction engine learning unit 136 may acquire the sampling coordinate group and the reconstructed image, based on the sample 106 imaged by the scanning electron microscope 101, and may learn the correction engine, based on the data. Alternatively, learning of the correction engine can be performed by using the sampling coordinate group or the reconstructed image obtained based on a learning sample different from the sample 106, which is obtained by another imaging device or simulation device.

With reference to FIG. 2, an overview of artifact correction in the scanning electron microscope device 100 of the first embodiment will be described. In the artifact correction, a low magnification, image 201 obtained by imaging the sample at a low magnification as illustrated in an upper left portion in FIG. 2 is first acquired. In a sample image 202 included in the low magnification image 201, the interest region 203 is set.

When the interest region 203 is set, a sparse sampling coordinate group 205 is set in the interest region 203. For example, the sparse sampling coordinate group 205 is set in only one frame. A reference numeral 204 in FIG. 2 represents a distribution range of sampling points set in the sparse sampling coordinate group 205.

It is desirable that positions of the sampling points in the sparse sampling coordinate group 205 is set to have high randomness. On the other hand, when the positions of the sampling points cannot have the high randomness due to hardware constraints, the artifacts tend to occur in the reconstructed image.

An image 211 on a middle left side in FIG. 2 schematically illustrates a high magnification image captured by fully sampling the interest region 203. On the other hand, an image 212 on a middle right side in FIG. 2 is the reconstructed image reconstructed based on the sparse pixel group obtained by sampling the interest region 203 with the sparse sampling coordinate group 205. The image 212 is the reconstructed image having the artifact. Since the image is reconstructed from the sparse pixel group, signal information deteriorates, and the artifact occurs. Therefore, the reconstructed image 212 generally has lower image quality than the captured image 211 captured by fully sampling the interest region 203.

In addition, an image 213 on a lower left side in FIG. 2 is an image in which the artifact of the reconstructed image 212 is corrected by using the correction engine after learning the artifact reduction process by using the above-described learning data set, and represents the reconstructed image in which the artifacts are reduced (remain a little).

When a sampling rate in the interest region 203 is sufficient for image reconstruction, the correction engine can sufficiently reduce the artifacts of the reconstructed image. On the other hand, when the sampling rate is not sufficient for image reconstruction, in some cases, it may be difficult to sufficiently reduce the artifacts by using the correction engine alone. In this case, in the present embodiment, the sampling coordinate group can be additionally set to image the sample 106, and a reconstructed image (third reconstructed image) can be acquired again. An image 214 on a lower right side in FIG. 2 is an image in which image reconstruction is performed based on the sparse sampling coordinate group 205 of the interest region 203 and the sparse pixel group obtained from the added sampling coordinate group, and the artifact of the reconstructed image is corrected by using the correction engine. The image 214 is the reconstructed image having substantially no artifact which is obtained by using the additional sampling coordinate group.

An example of a procedure for performing the artifact correction processing in the first embodiment will be described with reference to a flowchart in FIG. 3. It is assumed that an image capturing condition or information input or taught by a user which is used in the following processing is set in advance as parameter information.

In Step S301, an operator sets the interest region 203 on the sample 106 via the input/output unit 121, and determines an imaging region of the sample 106. This step corresponds to setting the interest region 203 on the sample image 202 in the low magnification image 201 (FIG. 2).

Subsequently, in Step S302, the sparse sampling coordinate group 205 is set in the interest region 203. A method for setting the sampling points of the sparse sampling coordinate group 205 is as follows, and several methods are conceivable.

(i) Image analysis is performed on the low magnification image 201. Based on an analysis result thereof, a range where a significant signal exists is extracted, and sampling points are set in the extracted range.

(ii) Sampling points are set, based on information taught in advance by the user.

In the present embodiment, a sampling point setting method other than the above-described method may be adopted. The sparse sampling coordinate group 205 may be set by being divided into a plurality of frames instead of one frame. In addition, the same pixel may be sampled multiple times. When the same pixel is not sampled multiple times, the sampling coordinate group may be expressed by a binary image (for example, a pixel to be sampled is set to white, and a pixel not to be sampled is set to black). On the other hand, when the same pixel is sampled multiple times, the sampling coordinate group can be expressed as a multivalued image.

In Step S303, the scanning electron microscope 101 irradiates a position on the sample 106 corresponding to the sampling point of the sampling coordinate group 205 with the electron beam from the electron gun 102, and obtains the sparse pixel value group corresponding thereto. Then, in Step S304, the reconstructed image is generated from the obtained sparse pixel value group. The reconstructed image corresponds to the reconstructed image 212 having the artifact.

Here, as a method for generating the reconstructed image, for example, a compressed sensing method may be used. According to one compressed sensing method, it is assumed that sampling data is sparse in an expression space using a dictionary image, and an image close to the captured image during full sampling can be reconstructed by linear summation of the dictionary image from the sampling data having the lesser number of data in full sampling. The dictionary image may be a dictionary image prepared based on a general discrete cosine transform, or may be a dictionary image specified by the user. In addition, another method is a method for using a neural network trained to output the reconstructed image by receiving the sparse pixel value group as an input.

When the reconstructed image is generated in this way, in Step S305 subsequent thereto, the artifact of the reconstructed image is corrected by using the correction engine trained to learn the artifact reduction processing. That is, as illustrated in FIG. 2, the pixel value group is assigned to the correction engine, or the reconstructed image having the artifact which is generated based on the pixel value group is assigned to the artifact reduction processing unit 133. In this manner, the reconstructed image 212 having the artifact is corrected to acquire the reconstructed image 213 in which the artifacts are reduced (remain a little). The correction engine is a network trained to learn (trained) to output the reconstructed image in which the artifacts are reduced or removed, by receiving the sampling coordinate group and the reconstructed image having the artifact as inputs. For example, a convolutional neural network is used as the network of the correction engine.

Here, a specific example of a learning sequence of the correction engine used in Step S305 will be described once with reference to a flowchart in FIG. 4. FIG. 4 illustrates an example of the learning sequence relating to the correction engine that performs the artifact reduction processing on the reconstructed image.

In Step S401, a variable i=1 is set, and Steps S402 to S406 are looped until the number of learning data candidates i=N. A learning data set is generated through the loop. When the number of samples to be imaged is defined N1, the number of interest regions to be set for each sample is defined N2, and a type of the sparse sampling coordinate group of the interest region is defined as N3, the number of learning data candidates N becomes N=N1×N2×N3.

In Step S402, Steps S301 to S304 described in FIG. 3 are performed, the interest region and the sampling coordinate group are set in the sampling coordinate setting unit 131, and the reconstructed image is generated in the reconstructed image generation unit 132. In Step S403 subsequent thereto, the artifact occurrence degree of the generated reconstructed image is evaluated in the artifact occurrence degree evaluation unit 134. This step corresponds to evaluating the artifact occurrence degree of the reconstructed image 213 in which the artifacts remain a little. In the method for evaluating the artifact occurrence degree, for example, a feature amount of each artifact can be modeled, based on discontinuity of an image pattern. The feature amount of the artifact is calculated for each local region of the reconstructed image, and a region having a great value of the feature amount is evaluated as a region having a high artifact occurrence degree. According to another method, a difference image is generated between an image obtained through super resolution of the interest region in the low magnification image and the reconstructed image. A region having a great pixel value of the difference image is evaluated as a region having a high artifact occurrence degree.

Still another method for evaluating the artifact occurrence degree is a method for using the evaluation engine trained to learn (trained) to output a distribution of the artifact occurrence degrees. The evaluation engine is a network trained to learn to output a distribution of the artifact occurrence degrees by receiving the sampling coordinate group and the reconstructed image having the artifact as inputs. For example, a convolutional neural network is used as the network of the evaluation engine. A specific example of a learning sequence of the evaluation engine will be described later.

When the artifact occurrence degree is evaluated, in Step S404 subsequent thereto, it is determined whether the artifact is present in the reconstructed image. When the artifact is absent (YES), the process proceeds to Step S407; and when the artifact is present (NO), the process proceeds to Step S405.

When the artifact is absent in the reconstructed image, the reconstructed image is excluded from candidates of the learning data (Steps S405 and S406 are omitted, and the process proceeds to Step S407). On the other hand, when the artifact is present in the reconstructed image, in Step S405, the interest region is fully sampled to acquire an image having no artifact. Then, in Step S406, the sparse sampling coordinate group, the reconstructed image having the artifact, and the image having no artifact are added to the learning data set as one set of data. When the pixel value groups are obtained from a plurality of detectors, the reconstructed image having a plurality of corresponding artifacts and an image having no artifact may be added as one set of data. In Step S407, in a case of i=N, the loop in Steps S402 to S406 is completed, and in a case of i<N, the process returns to Step S401, and the above-described procedure is repeated. When the N-number of learning data sets are acquired, the process proceeds to Step S408.

In Step S408, the acquired N-number of learning data sets are saved in the storage unit 124. In Step S409 subsequent thereto, variable j=1 is set, and Steps S410 to S413 are looped until the number of learning times j=M. Through the loop, learning of the correction engine which performs the artifact reduction processing is performed by the correction engine learning unit 136.

First, in Step S410, based on an artifact correction parameter of the correction engine, the reconstructed image in which the artifact is corrected is output from the sparse sampling coordinate group and the reconstructed image having the artifact. In a case of j=1, the artifact correction parameter of the correction engine may be initialized with a random number, or may be initialized with a parameter learned by using another learning data set.

In Step S411 subsequent thereto, a correction error is calculated by comparing the reconstructed image in which the artifact is corrected and the image having no artifact. For example, the correction error may be calculated as a mean square error. Then, in Step S412, it is determined whether the correction error is equal to or smaller than a predetermined threshold value. When the correction error is equal to or smaller than the threshold value (YES), the process proceeds to Step S415, and when the correction error is greater than the threshold value (NO), the process proceeds to Step S413.

When the correction error is equal to or smaller than the predetermined threshold value (YES), the process proceeds to Step S415, the calculated artifact correction parameter is saved, and the procedure in FIG. 4 is completed. On the other hand, when the correction error is greater than the predetermined threshold value, in Step S413, the artifact correction parameter is updated so that the correction error becomes smaller. In updating the parameter, for example, an error backpropagation method can be used. Thereafter, in Step S414, when j is the number of learning times M, the loop in Step S409 is completed, and when j is smaller than M, operations subsequent to Step S409 are repeated.

Referring back to FIG. 3, the description will resume from Step S306. In Step S306, the artifact occurrence degree of the generated reconstructed image is evaluated. Details thereof are the same as those in Step S403. In Step S307 subsequent thereto, it is determined whether the artifact in Step S305 is sufficiently corrected. In a case of YES, the process proceeds to Step S310. In a case of NO, it is determined that an additional sampling coordinate group is required, and the process proceeds to Step S308. Whether the artifact is sufficiently corrected is determined, for example, based on whether the artifact occurrence degree is greater than the threshold value. The threshold value for determining whether the artifact is sufficiently corrected may be set based on a user's input.

In Step S308, the sparse sampling coordinate group is additionally set in the interest region 203. For example, when a sampling rate of the interest region 203 is set to 10% in Step S302, while the randomness of the sampling coordinate group is maintained, the sampling coordinate group is additionally set so that the sampling rate of the interest region 203 becomes 20%. Other specific examples relating to Step S308 will be described later.

In Step S309, the position of the sample 106 corresponding to the sampling point of the added sampling coordinate group in the interest region 203 is irradiated with the electron beam to obtain the corresponding sparse pixel value group. The process returns to Step S304, and Steps S304 to S307 are performed again. In this case, when it is determined in Step S307 that the artifact is sufficiently corrected, the process proceeds to Step S310. In Step S310, the reconstructed image is displayed on the GUI. That is, at least one reconstructed image 214 having substantially no artifact is displayed on a GUI.

As described above, in the first embodiment, the sampling coordinate group is included in the teaching data, when the learning data set of the correction engine is generated. In this manner, the correction engine can learn a relationship between the sampling coordinate group and the reconstructed image of the artifact. Therefore, it is possible to uniformly reduce the artifacts varying due to the sampling coordinate group in the reconstructed image. In addition, the artifact occurrence degree of reconstructed images is evaluated, and the sampling rate is adjusted to a minimum level required for correcting the artifact. In this manner, while sample damage is suppressed, the artifact of reconstructed images can be corrected.

FIG. 5 schematically illustrates an example of a reconstructed image 510 of the interest region 203, an image 520 obtained by mapping the artifact occurrence degree of the reconstructed image 510, and a sparse sampling coordinate group 530 additionally set in the interest region 203.

The image 510 corresponds to the reconstructed image 213 illustrated in FIG. 2 in which the artifacts remain a little. However, a region 511 where the artifacts remain a little is different, and the image 510 is an image in which many artifacts occur in a portion of the image. The image 520 is an image obtained by mapping the artifact occurrence degree, and a region 521 is a region having the high artifact occurrence degree. The sampling coordinate group 530 is a sampling coordinate group which is additionally set in the interest region 203, and a reference numeral 531 represents a distribution range of the sampling points of the sparse sampling coordinate group 530 which is additionally set. For example, the sparse sampling coordinate group 530 is set in only one frame.

With reference to a flowchart in FIG. 6, the procedure for additionally setting the sampling coordinate group in the region having the high artifact occurrence degree in Step S308 will be described in detail. The description will be given with reference to FIG. 5 as appropriate.

First, in Step S601, an instruction is given to additionally set the sampling coordinate group. In accordance with the command, an additional sampling coordinate group is set according to a provisionally set sampling rate and a distribution range 204 of the sampling points. For example, the sampling coordinate group having the sampling rate different from the sampling rate of the sampling coordinate group set in step 302 and having the same distribution range 204 of the sampling points may be provisionally set as the additional sampling coordinate group.

In Step S602, based on the evaluation of the artifact occurrence degree (Step S306), the region having the high artifact occurrence degree is extracted, and the image 520 obtained by mapping the artifact occurrence degree as illustrated in FIG. 5 is generated and displayed on the display 156.

In Step S603 subsequent thereto, a mask image that divides the region having the high artifact occurrence degree and other regions is generated. An example of a method for generating the mask image is a binarizing method in which the pixel value in a region having the higher artifact occurrence degree than a predetermined threshold value is set to 1, and other pixel values are set to 0. The pixel values near the region having the high artifact occurrence degree are also effective for artifact correction. Therefore, a region where the pixel value is 1 can be widened by performing dilation processing on a binary image.

Then, in Step S604, the generated mask image is used to exclude the sampling coordinate group in the region having the low artifact occurrence degree. In this manner, it is possible to additionally set the sparse sampling coordinate group 530 (refer to FIG. 5), which excludes the sampling coordinate where the pixel value of the mask image is 0 from the provisional sparse sampling coordinate group (Step S601). In this case, a distribution range 531 of the sampling points of the sparse sampling coordinate group 530 corresponds to a region where the pixel value is 1 in the mask image. Through the above-described steps, the sampling coordinate group is additionally set only in the region having the high artifact occurrence degree. In this manner, the image can be additionally captured to a locally required minimum level, and damage to the sample can be suppressed.

The procedure for additionally setting the sampling coordinate group in Steps S307 to S309 described above may be omitted under a predetermined condition. In some cases, since the sampling coordinate group is set in Step S302, and a condition for generating the correction engine is properly set, the artifact reduction processing may be sufficiently performed to such an extent that subsequent correction of the artifact is not required. In this case, Steps S307 to S309 may be omitted. In addition, it is also possible to configure a device so that Steps S307 to S309 are not performed regardless of the condition.

FIG. 7 relates to a first modification example of the first embodiment, and is a modification example of the learning sequence of the correction engine used in Step S305. Some of the steps are the same as those in the first example in FIG. 4. Therefore, detailed description will be omitted, and different portions will be described in detail. The procedure illustrated in FIG. 7 updates an artifact correction parameter of the correction engine, based on the artifact occurrence degree.

First, in Step S701, the learning data set is generated and saved in the same manner as Steps S401 to S408. Then, in Step S702, a variable j=1 is set, and Steps S703 to S707 are looped until the number of learning times j=M. Through the loop, the artifact correction parameter of the correction engine is updated.

In Step S703, as in Step S410, the reconstructed image in which the artifact is corrected is output from the sparse sampling coordinate group and the reconstructed image having the artifact, based on the artifact correction parameter of the correction engine.

In Step S704 subsequent thereto, the artifact occurrence degree of the reconstructed image generated in Step S703 during learning of the artifact correction parameter is evaluated. A method for evaluating the artifact occurrence degree may be the same as that in Step S403.

Then, in Step S705, based on an evaluation result of the artifact occurrence degree, an error between the reconstructed image in which the artifact is corrected and the image having no artifact is calculated as a correction error. For example, as the correction error, it is possible to use an error in which a mean square error of the artifact occurrence degrees is added to a mean square error of the reconstructed image in which the artifact is corrected and the image having no artifact. It may be assumed that the artifact occurrence degree of the image having no artifact is zero.

As described above, in the first modification example, during learning of the correction engine, the parameter of the correction engine is updated, based on the evaluation result of the artifact occurrence degree. In this manner, the correction engine can accurately learn the artifact reduction processing of reconstructed images.

FIG. 8 is a flowchart illustrating a specific example of the learning sequence of the evaluation engine that outputs a distribution of the artifact occurrence degrees in Step S306 according to a second modification example of the first embodiment.

First, in Steps S801 to S804, the same operations as those in Steps S401 to S404 in FIG. 4 are performed. In Step S804, it is determined whether the artifact is present in the reconstructed image. When the artifact is absent (YES), the process proceeds to Step S807; and when the artifact is present (NO), the process proceeds to Step S805.

When the artifact is absent in the reconstructed image, the reconstructed image is excluded from candidates of the learning data (Steps S805 and S806 are omitted, and the process proceeds to Step S807). On the other hand, when the artifact is present in the reconstructed image, in Step S805, the distribution of the artifact occurrence degrees of the reconstructed image is output as a GUI on the display 156, and the GUI prompts a user to change the distribution. When there is an error in the distribution of the artifact occurrence degrees, the user teaches a correct distribution. The distribution of the artifact occurrence degrees may be expressed as a binary value, or may be expressed as a multiple value.

In Step S806 subsequent thereto, the learning data set in which the e sampling coordinate group, the reconstructed image having the artifact, and the distribution of artifact occurrence degrees are used as one set is added. In Step S807, in a case of i=N, the loop in Steps S802 to S806 is completed. In a case of i<N, the process returns to Step S801 and the above-described procedure is repeated. When the N-number of learning candidate data sets are processed, the process proceeds to Step S808.

When the learning data set is saved in Step S808, the variable j=1 is set in Step S809, and Steps S810 to S813 are looped until the number of learning times j=M. Through this loop, learning of the evaluation engine that outputs the distribution of the artifact occurrence degrees is performed.

In Step S810, the distribution of the artifact occurrence degrees is output from the sparse sampling coordinate group and the reconstructed image having the artifact, based on an artifact occurrence degree evaluation parameter of the evaluation engine. In a case of j=1, the artifact occurrence degree evaluation parameter of the evaluation engine may be initialized with a random number, or may be initialized with a parameter learned by using another learning data set.

In Step S811, a difference between the distribution of the artifact occurrence degrees output in Step S810 and the distribution of the artifact occurrence degrees of the learning data set is calculated as a distribution error. For example, the distribution error can be calculated as a mean square error.

In Step S812, it is determined whether the distribution error is equal to or smaller than a predetermined threshold value. When the distribution error is equal to or smaller than the threshold value (YES), the process proceeds to Step S815, and when the distribution error is greater than the threshold value (NO), the process proceeds to Step S813. In Step S813, the artifact occurrence degree evaluation parameter is updated so that the distribution error becomes smaller. As a method for updating the parameter, for example, an error backpropagation method can be used. In Step S814, when j is the number of learning times M, the loop in Steps S810 to S813 is completed. In Step S815, the artifact occurrence degree evaluation parameter of the evaluation engine is saved in the storage unit 124.

As described above, in the second modification example, the evaluation engine trained to output the distribution of the artifact occurrence degrees is used. In this manner, it is possible to accurately evaluate the distribution of the artifact occurrence degrees which are less likely to be modeled by performing rule base processing.

FIG. 9 is an example of a GUI screen that displays an image obtained by mapping the artifact occurrence degree together with the reconstructed image on a screen of the display 156 in the device according to the first embodiment.

As an example, a GUI screen 900 in FIG. 9 includes a parameter setting window 901, and may be configured to display (a) reconstructed images 510 and 214, (b) images 520 and 909 obtained by mapping the artifact occurrence degree, and (c) sparse sampling coordinate group 905, 907, and 910.

Here, in the sparse sampling coordinate groups 905, 907, and 910, sampling coordinates 906, 908, and 911 are simply displayed. The sparse sampling coordinate groups 905, 907, and 910 respectively indicate the sampling coordinate group for initial setting, the sampling coordinate group for additional setting, and the sampling coordinate group obtained by combining the initial setting and the additional setting.

A parameter setting window 901 is configured to be capable of setting a sampling rate 902 of the sampling coordinate group during the initial setting, an increase rate 903 from the initial setting in the additionally set sampling coordinate group, and a threshold value 904 of the artifact occurrence degree.

A display example in FIG. 9 is merely an example, and these may be temporally divided and displayed, or may be simultaneously displayed. For example, in the procedure in FIG. 3, in Step S302, the sampling coordinate group 905 for the initial setting can be first displayed on the display 156, and subsequently in Step S305, the reconstructed image 510 in which the artifacts are reduced (remain a little) can be displayed. Then, in Step S306, an image 520 obtained by mapping the artifact occurrence degree can be displayed, and in Step S308, a sampling coordinate group 907 for the additional setting can be displayed. Here, a sampling coordinates 908 included in the sampling coordinate group 907 are located within a range 531 set based on the region 521 having the high artifact occurrence degree. Furthermore, a sampling coordinate group 910 obtained by combining the initial setting and the additional setting is displayed.

In the second Step S305 after the sampling coordinate group is additionally set, the reconstructed image 214 having substantially no artifact may be displayed on the display 156. In addition, in the second Step S306, an image 909 obtained by mapping the artifact occurrence degree may be displayed. Here, since the artifact occurrence degree of the reconstructed image 214 is smaller than the threshold value 904, there is no region having the high artifact occurrence degree (image 909). In this manner, the reconstructed image and the distribution of the artifact occurrence degrees are displayed in combination. Therefore, while an allowable artifact occurrence degree can be confirmed, it becomes possible to smoothly set the sampling coordinate group to a minimum required level.

Second Embodiment

The scanning electron microscope device 100 which is an observation device according to a second embodiment will be described with reference to FIGS. 10 and 11. An overall configuration of the scanning electron microscope device 100 of the second embodiment is the same as that of the first embodiment, and thus, repeated description will be omitted below. The second embodiment is different from the first embodiment in the following point. The second embodiment uses the correction engine trained to learn a process for generating the reconstructed image (second reconstructed image) having substantially no artifact from the sparse pixel value group without using the reconstructed image having the artifact (first reconstructed image).

An example of artifact correction processing in the device according to the second embodiment will be described with reference to a flowchart in FIG. 10. First, in Steps S1001 to S1004, the same processing as that in Steps S301 to S304 is performed to set the interest region and the sampling coordinate group, and to generate the reconstructed image.

Steps S1005 to S1009 are the same processing as Steps S306 to S310, and detailed description will be omitted. However, in the second embodiment, in Step S1004, the correction engine trained to learn the process for generating the reconstructed image having substantially no artifact from the sparse pixel value group is used to generate the reconstructed image obtained from the sparse pixel value group obtained from the sampling coordinate group of the interest region. This step corresponds to generating the reconstructed image 214 having substantially no artifact from the sparse pixel value group obtained from the sparse sampling coordinate 205 set in the interest region 203. The correction engine is a network trained to learn to output the reconstructed image having no artifact by receiving the sampling coordinate group and the sparse pixel value group as inputs. For example, a convolutional neural network is used as the network of the correction engine.

An example of the learning procedure of the correction engine in the second embodiment will be described with reference to a flowchart in FIG. 11. Through the procedure in FIG. 11, the correction engine that obtains the reconstructed image having substantially no artifact is trained.

In Step S1101, the variable i=1 is set, and Steps S1102 to S1104 are repeatedly performed (looped) until the number of learning data i=K. A learning data set is generated through the loop. When the number of samples to be imaged is defined as N1, the number of interest regions set for each sample is defined as N2, and a type of the sparse sampling coordinate group of the interest region is defined as N3, the number of learning data K is K=N1×N2×N3.

In Step S1102, the sparse sampling coordinate group and the sparse pixel value group are acquired by using the same procedure as that in Steps S301 to S303. In Step S1103, the interest region 203 is fully sampled to acquire an image having no artifact.

In Step S1104, the sparse sampling coordinate group, the sparse pixel value group, and the image having no artifact are added to the learning data set as one set of data. In Step S1105, in a case of i=K, the loop in Steps S1102 to S1104 is completed. In a case of i<K, the process returns to Step S1101, and the above-described procedure is repeated. In Step S1106, the learning data set is saved in the storage unit 124.

In Step S1107, the variable j=1 is set, and Steps S1108 to S1112 are repeatedly performed (looped) until the number of learning times i=M. Through the loop, learning of the correction engine is performed to generate the reconstructed image having no artifact. In Step S1108, the reconstructed image having substantially no artifact is output from the sparse sampling coordinate group and the sparse pixel value group, based on the reconstruction parameter of the correction engine. In a case of j=1, the reconstruction parameter of the correction engine may be initialized with a random number, or may be initialized with a parameter learned by using another learning data set.

In Step S1109, the artifact occurrence degree of the reconstructed image is evaluated during learning of the reconstruction parameter. A method for evaluating the artifact occurrence degree may be the same as that in Step S403.

In Step S1110, a difference between the reconstructed image and the image having no artifact is calculated as a reconstruction error, based on the artifact occurrence degree determined in Step S1109. As the reconstruction error, for example, it is possible to use an error in which a mean square error of the artifact occurrence degrees is added to a mean square error of the reconstructed image and the image having no artifact. It may be assumed that the artifact occurrence degree of the image having no artifact is zero.

In Step S1111, it is determined whether the reconstruction error is equal to or smaller than a predetermined threshold value. When the reconstruction error is equal to or smaller than the threshold value (YES), the process proceeds to Step S1114, and when the reconstruction error is greater than the threshold value (NO), the process proceeds to Step S1112. When the reconstruction error is equal to or smaller than the predetermined threshold value, the reconstruction parameter calculated in Step S1114 is saved, and the procedure in FIG. 11 is completed.

In Step S1112, the artifact correction parameter is updated so that the reconstruction error becomes smaller. As a method for updating the parameter, for example, an error backpropagation method can be used. In Step S1113, in a case of j=M, the loop in Steps S1108 to S1112 is completed, and the process proceeds to Step S1114.

In the second embodiment, the reconstructed image having substantially no artifact is generated from the sparse pixel value group without using the reconstructed image having the artifact. Therefore, fewer processing steps are performed compared to the first embodiment, and usability can be improved.

Third Embodiment

With reference to FIG. 12, the scanning electron microscope device 100 which is an observation system according to a third embodiment will be described. An overall configuration of the scanning electron microscope device 100 of the third embodiment is the same as that of the first embodiment. Therefore, repeated description will be omitted below. The third embodiment is different from the embodiments described above in the following point. Layout design data (hereinafter, referred to as design data) of a pattern on the sample 106 to be observed is acquired in advance. In this manner, a configuration is adopted to effectively set the sampling coordinate group and to evaluate the artifact occurrence degree.

As an example, when the sample 106 is a semiconductor, the design data may be a file in which edge information of a design shape of a semiconductor circuit pattern is written as coordinate data. Specifically, it is design data written in a format such as GDSII and OASIS. Since the design data is utilized, pattern layout information can be obtained without actually imaging the sample 106.

An example of a procedure for performing the artifact correction processing in the third embodiment will be described with reference to a flowchart in FIG. 12. First, in Step S1201, design data of the sample 106 is read. In a case of the sample having no design data, an image obtained through super resolution of the low magnification image of the sample may be used instead of the design data.

Next, in Step S1202, as in Step S301 (FIG. 3), the interest region 203 is set on the sample 106, and an imaging region of the sample 106 is determined. Furthermore, subsequently in Step S1203, the sparse sampling coordinate group is set in the interest region 203, based on the design data.

For example, in the third embodiment, the reconstructed image is generated in such a manner that the sample is imaged in advance by using various sampling coordinate groups, and analysis results of the reconstructed images are stored in the storage unit 124 as a database. When the design data is read in Step S1201, an optimal sampling coordinate group is selected and set in accordance with the analysis results relating to the sample which is the same as or similar to the design data.

In setting the sampling coordinate group, based on the design data (Step S1203), for example, instead of setting a uniform sampling coordinate in an entire region, the sampling coordinate group may be set for the interest region by locally changing sampling density. In addition, even when data which coincides with the set interest region is not retrieved from the database, data similar to the interest region may be retrieved from data in the database, and the sampling coordinate group corresponding to the similar data may be set for the interest region.

The sampling coordinate group may be set for the sample relating to the design data by using an estimation engine trained to learn the processing, based on the database. For example, the estimation engine is a network trained to learn to output the sparse sampling coordinate group by receiving the design data as an input. On the GUI of the display 156, for example, read design data, design data referenced from the database, and candidates of the sampling coordinate group can be displayed to prompt a user to select the sampling coordinate group.

After the sampling coordinate group is set in Step S1203, subsequently in Step S1204, as in Step S303 in FIG. 3, the sampling coordinate group 205 set in the interest region 203 is imaged, and the corresponding sparse pixel value group is obtained. Then, in Step S1205, as in Step S304, the reconstructed image is generated from the obtained sparse pixel value group. In Step S1206 subsequent thereto, the artifact of the reconstructed image is corrected by using the correction engine trained to learn the artifact reduction processing, learning sequence of the correction engine will be described later.

In Step S1207, the artifact occurrence degree is evaluated, based on the design data. In Step S1208 subsequent thereto, it is determined whether the artifact in Step S1206 is sufficiently corrected. In a case of YES, the process proceeds to Step S1211; and in a case of NO, the process proceeds to Step S1209.

In Step S1209, the sparse sampling coordinate group is additionally set in the interest region. The specific method is the same as that in Step S308 in FIG. 3. In Step S1210, the position of the sample 106 corresponding to the sampling point of the added sampling coordinate group of the interest region is irradiated with the electron beam to obtain the corresponding sparse pixel value group. The process returns to Step S1205, and Steps S1205 to S1208 are performed again. In this case, when it is determined in Step S1208 that the artifact is sufficiently corrected, the process proceeds to Step S1211. In Step S1211, the reconstructed image is displayed on the GUI. That is, at least one reconstructed image having substantially no artifact is displayed on the GUI.

In the third embodiment, since the sampling coordinate group is set, based on the design data, it is possible to set the optimum sampling coordinate group for the sample. Therefore, robustness of the image reconstruction processing and the artifact correction processing for the sample can be improved. In addition, since the artifact occurrence degree is evaluated, based on the design data, the design data can be used as an evaluation reference. Therefore, it is possible to accurately evaluate the artifact occurrence degree.

A specific example of the learning sequence of the correction engine used in Step S1206 will be described with reference to a flowchart in FIG. 13. In FIG. 13, Step S1301 corresponds to Step S401, Step S1302 corresponds to Step S402 (Steps S1201 to S1205), Steps S1304 and S1305 correspond to Steps S404 and S405, Steps S1307 to S1310 correspond to Steps S407 to S410, Step S1312 corresponds to Step S705, and Steps S1313 to S1316 correspond to Steps S412 to S415.

Therefore, repeated description will be omitted below, and only portions different from those in the above-described embodiments will be described.

In Step S1303, the artifact occurrence degree is evaluated, based on the design data. As a method for evaluating the artifact occurrence degree, based on design data, for example, the following method can be adopted. A Sobel filter is used to generate edge images of the reconstructed image and the design data, and a region having a large difference between the edge images is evaluated as the region having the high artifact occurrence degree.

As another method, the following method can be adopted. A difference image between an image converted into image quality close to the captured image by using the design data and an image conversion engine, and the reconstructed image is generated, and a region having a great pixel value of the difference image is evaluated as the region having the high artifact occurrence degree. For example, the image conversion engine is a network trained to learn to output the captured image of the interest region by receiving the design data of the interest region as an input.

In Step S1306, the design data, the sparse sampling coordinate group, the reconstructed image having the artifact, and the image having no artifact are added to the learning data set as one set of data.

In Step S1311, the artifact occurrence degree of the reconstructed image in which the artifact is corrected during learning of the artifact correction parameter is evaluated, based on design data. The method for evaluating the artifact occurrence degree is the same as that in Step S1303.

An example of a specific procedure for aligning the sampling coordinate group, based on the design data in Step S1203 of the third embodiment will be described with reference to a flowchart in FIG. 14. In Step S1401, the sparse sampling coordinate group for alignment is set in the interest region. In order that the sample is not damaged, the sampling coordinate group for alignment may be set at a lower sampling rate than that of the sampling coordinate group for image reconstruction. In addition, the sampling coordinate group for alignment may be locally set instead of the entire interest region.

In Step S1402 subsequent thereto, a position on the sample 106 corresponding to the sampling point of the sampling coordinate group for alignment is irradiated with the electron beam to acquire the sparse pixel value group. Then, in Step S1403, the reconstructed image is generated from the sparse pixel value group. The method for generating the reconstructed image may be the same as that in Step S304.

In Step S1404, a positional deviation amount of the sparse sampling coordinate group is calculated, based on the design data and the reconstructed image for alignment which is obtained in Step S1403. As a method for calculating the positional deviation amount, for example, the following method is adopted. A Sobel filter is used to generate edge images of the reconstructed image and the design data, and the positional deviation amount is calculated from a peak position in a normalized cross-correlation map of the edge images. Then, in Steps S1405 and S1406, the sampling coordinate group is corrected, based on the calculated positional deviation amount, and the corrected sampling coordinate group is set. In this way, in the interest region, the sampling coordinate group for generating the reconstructed image is aligned by using the sampling coordinate group for alignment. In this manner, the pixel value group can be obtained from coordinates optimized, based on the design data. Therefore, the image can be accurately reconstructed.

The present invention is not limited to the above-described embodiments, and includes various modification examples. For example, the above-described embodiments have been described in detail to facilitate understanding of the present invention, and the present invention is not necessarily limited to those which include all of the above-described configurations. In addition, a part of the configuration in one embodiment can be replaced with a configuration of another embodiment, and the configuration of another embodiment can be added to the configuration of one embodiment. In addition, a part of the configuration of each embodiment can be added, deleted from, and replaced with other configurations. In addition, each configuration, function, processing unit, and processing means which are described above may be partially or entirely realized through hardware by designing an integrated circuit, for example.

REFERENCE SIGNS LIST

100: Scanning electron microscope device
101: Scanning electron microscope
102: Electron gun
103: Electron beam (charged particle beam)
104: Condenser lens
105: Objective lens
106: Sample
107: Stage
108: Detector
121: Input/output unit
122: Control unit
123: Processing unit
124: Storage unit
125: Image processing unit
131: Sampling coordinate setting unit
132: Reconstructed image generation unit
133: Artifact reduction processing unit
134: Artifact occurrence degree evaluation unit
135: Sampling coordinate adjustment unit
136: Correction engine learning unit
151: CPU
152: ROM
153: RAM
154: Hard disk drive
155: Input device
156: Display
200: Computer

201: Low magnification image
202: Sample image
203: Interest region
204: Distribution range of sampling points
205: Sampling coordinate group
211: High magnification image captured by fully sampling interest region 203
212: Reconstructed image reconstructed, based on a sparse pixel group obtained by sampling interest region 203 with sparse sampling coordinate group 205
213: Image in which artifact of reconstructed image
212 is corrected by using correction engine (reconstructed image in which artifacts are reduced)
214: Reconstructed image having substantially no artifact which is obtained by using additional sampling coordinate group
510: Reconstructed image
520: Image obtained by mapping artifact occurrence degree
530: Sampling coordinate group
531: Distribution range of sampling points
900: GUI screen
901: Parameter setting window
905, 907, 910: Sparse sampling coordinate group
906, 908, 911: Sampling coordinate
909: Image obtained by mapping artifact occurrence degree

The invention claimed is:

1. An observation system comprising:
an imaging device; and
a processor subsystem,
wherein the processor subsystem sets a sparse sampling coordinate group, including coordinate data of a plurality of sampling points with respect to a sample,
acquires a pixel value group corresponding to the sparse sampling coordinate group on the sample, and
generates a second reconstructed image with reduced artifacts by assigning either the pixel value group or a first reconstructed image generated based on the pixel value group to a correction engine, and
the correction engine is trained by using a plurality of learning data sets including data (1) to (3) regarding the sample or a learning sample:
(1) a sparse learning sampling coordinate group including coordinate data of a plurality of sampling points set for the sample or a learning sample,
(2) a learning pixel value group corresponding to the sparse learning sampling coordinate group or a learning reconstructed image having an artifact generated based on the learning pixel value group, and
(3) a learning image which includes no artifact generated based on a pixel value group corresponding to a coordinate group at least including the sparse learning sampling coordinate group, or in which artifacts are reduced.

2. The observation system according to claim 1,
wherein the processor subsystem is configured to evaluate an artifact occurrence degree of the second reconstructed image, to determine whether adding a sampling coordinate group is required, based on the artifact occurrence degree, to generate an additional sampling coordinate group in accordance with a result of determining whether the adding is required, and to generate a third reconstructed image by obtaining a pixel value group in accordance with the additional sampling coordinate group.

3. The observation system according to claim 2,
wherein the additional sampling coordinate group is added to a region where the artifact occurrence degree is high.

4. The observation system according to claim 2,
wherein in evaluating the artifact occurrence degree, the processor subsystem uses an evaluation engine trained to output a distribution of artifact occurrence degrees by receiving the sampling coordinate group and the first reconstructed image as inputs.

5. The observation system according to claim 2, further comprising:
a display unit that displays an image indicating the artifact occurrence degree.

6. The observation system according to claim 1,
wherein the processor subsystem updates a parameter of the correction engine, based on an artifact occurrence degree of the second reconstructed image generated by the correction engine.

7. An observation system comprising:
an imaging device; and
a processor subsystem,
wherein the processor subsystem sets a sparse sampling coordinate group, including coordinate data of a plurality of sampling points with respect to a sample,
acquires a pixel value group corresponding to the sparse sampling coordinate group on the sample, and
generates a second reconstructed image with reduced artifacts by assigning either the pixel value group or a first reconstructed image generated based on the pixel value group to a correction engine,
the correction engine is trained by using a plurality of learning data sets regarding the sample or a learning sample, including data (1) to (3):
(1) a sparse learning sampling coordinate group including coordinate data of a plurality of sampling points set for the sample or a learning sample,
(2) a learning pixel value group corresponding to the sparse learning sampling coordinate group or a learning reconstructed image having an artifact generated based on the learning pixel value group, and
(3) a learning image which includes no artifact generated based on a pixel value group corresponding to a coordinate group at least including the sparse learning sampling coordinate group, or in which artifacts are reduced, and
the processor subsystem is configured to read design data of the sample and to set a sampling coordinate group based on the design data.

8. The observation system according to claim 7,
wherein the processor subsystem evaluates an artifact occurrence degree of the second reconstructed image, based on the design data, determines whether adding the sampling coordinate group is required, based on the artifact occurrence degree, generates an additional sampling coordinate group in accordance with a result of determining whether the adding is required, and generates a third reconstructed image by obtaining a pixel value group in accordance with the additional sampling coordinate group.

9. The observation system according to claim 7,
wherein a sampling coordinate group for alignment is set with respect to the sample,
a reconstructed image for alignment is generated by obtaining a pixel value group in accordance with the sampling coordinate group for alignment, a positional deviation amount of the sparse sampling coordinate group with respect to the sample is calculated, based on the design data and the reconstructed image for alignment, and the sparse sampling coordinate group is corrected, based on the positional deviation amount.

10. An artifact correction method in a processor subsystem, comprising:

setting a sparse sampling coordinate group, including coordinate data of a plurality of sampling points with respect to a sample;

acquiring a pixel value group corresponding to the sparse sampling coordinate group on the sample; and generating a second reconstructed image with reduced artifacts by assigning either the pixel value group or a first reconstructed image generated based on the pixel value group to a correction engine, wherein the correction engine is trained by using a plurality of learning data sets including data regarding the sample or a learning sample, the data comprising:

a sparse learning sampling coordinate group including coordinate data of a plurality of sampling points set for the sample or a learning sample, a learning pixel value group corresponding to the sparse learning sampling coordinate group or a learning reconstructed image having an artifact generated based on the learning pixel value group, and a learning image which includes no artifact generated based on a pixel value group corresponding to a coordinate group at least including the sparse learning sampling coordinate group, or in which artifacts are reduced.

11. The artifact correction method according to claim 10, further comprising:

evaluating an artifact occurrence degree of the second reconstructed image;

determining whether adding a sampling coordinate group is required, based on the artifact occurrence degree;

generating an additional sampling coordinate group in accordance with a result of determining whether the adding is required; and generating a third reconstructed image by obtaining a pixel value group in accordance with the additional sampling coordinate group.

12. The artifact correction method according to claim 11, wherein the additional sampling coordinate group is added to a region where the artifact occurrence degree is high.

13. The artifact correction method according to claim 11, wherein in evaluating the artifact occurrence degree, an evaluation engine trained to output a distribution of artifact occurrence degrees by receiving the sampling coordinate group and the first reconstructed image as inputs is used.

14. The artifact correction method according to claim 11, further comprising:

displaying an image indicating the artifact occurrence degree.

15. A non-transitory computer-readable storage medium storing an artifact correction program that causes a processor subsystem to execute the artifact correction method according to claim 11.

16. The artifact correction method according to claim 10, further comprising:

updating a parameter of the correction engine, based on an artifact occurrence degree in the second reconstructed image generated by the correction engine.

* * * * *